United States Patent
Sang et al.

(10) Patent No.: US 9,965,386 B2
(45) Date of Patent: May 8, 2018

(54) METHOD FOR GENERATING ROW TRANSPOSED ARCHITECTURE BASED ON TWO-DIMENSIONAL FFT PROCESSOR

(71) Applicant: HUAZHONG UNIVERSITY OF SCIENCE AND TECHNOLOGY, Wuhan, Hubei (CN)

(72) Inventors: Hongshi Sang, Hubei (CN); Yinghua Gao, Hubei (CN); Peng Hu, Hubei (CN)

(73) Assignee: Huazhong University of Science and Technology, Wuhan, Hubei (CN)

(*) Notice: Subject to any disclaimer, the term of this patent is extended or adjusted under 35 U.S.C. 154(b) by 68 days.

(21) Appl. No.: 15/233,601

(22) Filed: Aug. 10, 2016

(65) Prior Publication Data

US 2017/0337129 A1   Nov. 23, 2017

(30) Foreign Application Priority Data

May 17, 2016 (CN) .......................... 2016 1 0325060

(51) Int. Cl.
G06F 17/14 (2006.01)
G06F 12/06 (2006.01)

(52) U.S. Cl.
CPC .................. *G06F 12/06* (2013.01)

(58) Field of Classification Search
CPC ...................................................... G06F 12/06
USPC ............................................... 708/400–409
See application file for complete search history.

(56) References Cited

U.S. PATENT DOCUMENTS

| | | | | |
|---|---|---|---|---|
| 4,807,183 A | * | 2/1989 | Kung .................. | G06F 13/4022 708/404 |
| 5,751,616 A | * | 5/1998 | Hegland ................. | G06F 17/14 708/401 |
| 5,805,476 A | * | 9/1998 | Kim ........................ | G06F 17/16 708/200 |

(Continued)

*Primary Examiner* — Tan V. Mai
(74) *Attorney, Agent, or Firm* — Hamre, Schumann, Mueller & Larson, P.C.

(57) ABSTRACT

The invention discloses a method for generating a row transposed architecture based on a two-dimensional FFT processor, comprising the following characteristic: the FFT processor includes an on-chip row transposition memory for storing an image row transposition result. When the size of the row transposition result exceeds the capacity of the on-chip memory, the first 2k data of a row of the two-dimensional array after row transformation is written into the on-chip row transposition memory, the remaining data is written into the off-chip SDRAM, and k is acquired through calculation according to the row transposition result and the capacity of the on-chip row transposition memory. The on-chip memory is divided into two memories A and B used for storing the row transposition partial result and temporarily storing data read from off-chip SDRAM. When data is read from the memory A or B column by column for FFT column transposition, SDRAM is accessed in a row burst manner and data is written into the empty memory A or B alternately, and finally SDRAM is empty through repetitive ping-pong switching between the memories A and B. The row transposed architecture is capable of substantially reducing cross-line accessing frequency of SDRAM and improving two-dimensional FFT execution speed.

5 Claims, 6 Drawing Sheets

(56) References Cited

U.S. PATENT DOCUMENTS 7,031,994 B2* 4/2006 Lao .................. G06F 7/785
                                                708/400

* cited by examiner

… (US 9,965,386 B2)

METHOD FOR GENERATING ROW TRANSPOSED ARCHITECTURE BASED ON TWO-DIMENSIONAL FFT PROCESSOR

TECHNICAL FIELD

The invention generally relates to the field of digital signal processing, and more particularly, to a method for generating a row transposed architecture based on a two-dimensional FFT processor.

BACKGROUND OF THE INVENTION

FFT transformation is widely used in the fields of image processing, wireless communication, voice recognition, spectrum analysis, radar processing, remote sensing and measuring, geological exploration and so on. In one-dimensional signal processing, various high-effective FFT algorithms have been used. To process points of the integral power of two, algorithms such as a Cooley-Tukey algorithm, a Sander-Tukey algorithm, a split radix algorithm can be used. To process points of the non-integer power of two, algorithms such as a Good-Thomas prime factor algorithm, a Winograd nested algorithm can be used. In two-dimensional signal processing, a row-column decomposition algorithm and a vector radix algorithm can be used.

The vector radix algorithm processes a two-dimensional array as a one-dimensional sequence, accesses butterfly operation numbers in parallel by dividing N$\lambda$N point data into multiple independent and small point units, and thus facilitating 2D-FFT by using a vector radix 2×2 butterfly operation hardware unit only. Compared with a conventional row-column decomposition algorithm, the vector radix algorithm significantly saves hardware resources, and improves a calculation speed. However, although the algorithm can effectively reduce computation in processing small-scale data arrays, as it handles large-scale data arrays, such as a 8192×8192 two-dimensional FFT calculation, a data control process becomes complex, and requirement for a on-chip memory is extremely high.

Compared with the vector radix algorithm, the row-column decomposition algorithm is more widely used and mature. For the row-column decomposition algorithm, FFT calculation is conducted on each row of the two-dimensional array, so as to obtain an intermediate result, then FFT calculation is conducted on each column of the two-dimensional array, so as to obtain a final two-dimensional FFT result. The algorithm divides FFT calculation of the two-dimensional array into multiple times of one-dimensional FFT calculation, which simplifies a data flow diagram, reduces capacity of on-chip memories, and makes it possible to design VLSI and reduce area of a silicon wafer. The present invention employs the row-column decomposition algorithm.

Row transposition of a large-scale data array is mainly implemented by two methods: the first one is to use a corner turning memory to conduct row and column transformation on a processing module for saving a two-dimensional array after row transformation, and to change a read mode of the memory; the second one is to write a two-dimensional array after row transformation into the memory according to transposed addresses, and to sequentially read out the array.

Methods for implementing image transposition by the corner turning memory mainly comprise an input/output balancing method, a block matrix method, a row-in and column-out method, and a two-frame or three-frame corner turning algorithm, amongst the row-in and column-out method and the block matrix method are two methods for transposing FFT row transformation results. The row-in and column-out method sequentially stores data after two-dimensional row transformation into an off-chip SDRAM in a direction of a row, and continuously reads a series of data in a direction of a column. However, if the worst situation where every time data on a column is read, it is required to conduct row activation thereon, which takes several clock cycles, and may reduce an efficiency of accessing the off-chip SDRAM. The block matrix method is slightly better than the row-in and column-out method, it stores segmented two-dimensional data into the off-chip SDRAM in rows, namely storing one row in the two-dimensional data into a regional block of the off-chip SDRAM. However, since cross-line reading often take place, an efficiency of accessing the off-chip SDRAM is comparatively low.

SUMMARY OF THE INVENTION

In view of the above-mentioned problems, it is an objective of the invention to provide a method for generating a row transposed architecture based on a two-dimensional FFT processor that is capable of improving poor efficiency of accessing the off-chip SDRAM in conventional image transposition methods.

In order to achieve the above goals, this invention provides a method for generating a row transposed architecture based on a two-dimensional FFT processor, comprising steps of:

S1. determining whether a size of a two-dimensional array after row transformation M*N is greater than the number of memory cells s of an on-chip memory, proceeding to step S2 if yes, and proceeding to step S3 if no, where M represents the number of rows of the two-dimensional array, N represents the number of columns of the two-dimensional array, and ½s is greater than M;

S2. conducting row transposition by the on-chip memory and an off-chip SDRAM, comprising sub-steps of:

(a) dividing the on-chip memory into two memories A and B, each memory having ½s memory cells;

(b) sequentially writing first k data of a row of the two-dimensional array after row transformation into the memory A, the following k data thereof into the on-chip memory B, and the remaining (N−2K) data thereof into the off-chip SDRAM, and repeating the process for the remaining rows of the two-dimensional array until all data of all rows thereof are sequentially written into the memories A and B, and the off-chip SDRAM, where $$k = \left\lfloor \frac{s}{2M} \right\rfloor;$$

(c) repeatedly reading M data from the memory A based on transpose addresses and transmitting the M data to a FFT kernel for column transformation, until all data in the memory A are read;

(d) repeatedly reading M data from the memory B based on a transposed addresses and transmitting the M data to a FFT kernel for column transformation, and repeatedly reading and parallel executing first X data of a row of the two-dimensional array from the off-chip SDRAM in a manner of sequential burst, and writing the data into the memory A until all data of first X columns thereof are written into the memory A, where $$X = \begin{cases} k; \text{when} & k \leq N - (n+1)k \\ N - (n+1)k; \text{when} & k > N - (n+1)k \end{cases}$$

n represents the $n^{th}$ time data are written from the off-chip SDRAM and written into the on-chip memory;

(e) reading data in the memory A according to the transposed address, executing reading data from the off-chip SDRAM to the memory B in parallel, and simultaneously reading the memory A and writing the memory B according to step (d) until the memory A is empty and the memory B is full, reading data in the memory B according to the transposed address, and repeating the above process until the $n_1^{th}$ time where data are read from the off-chip SDRAM to the on-chip memory (where $$\left( \text{where } n_1 \geq \frac{N - 2k}{k} \right),$$

reading data on the $[N-(n_1+1)*k]^{th}$ column, and emptying the off-chip SDRAM;

S3. conducting row transposition by the on-chip memory:

serially writing results after two-dimensional row transformation into the memories A and B, namely buffering first ½N data on every row of totally M rows into the memory A, and last ½N data thereon into the memory B;

reading data in the memory A according the transposed address until the memory A is empty, namely reading M data and transmitting the data to a FFT kernel for column transformation each time, and reading data in the memory B according the transposed address until the memory B is empty, namely reading M data and transmitting the data to the FFT kernel for column transformation each time.

In a class of this embodiment, writing operation in step (b) is as follows:

sequentially writing M*N data generated by two-dimensional row transformation into the on-chip memory and the off-chip SDRAM, and writing first k data of a row of the two-dimensional array into the memory A, the following k data thereof into the on-chip memory B, and the remaining (N-2k) data thereof into the off-chip SDRAM, thus M rows generated by two-dimensional row transformation are written into the on-chip memory and the off-chip SDRAM, the first M*2k image pixels being stored in the on-chip memory, and the last M*(N-2k) image pixels being stored in the off-chip SDRAM.

In a class of this embodiment, the step of repeatedly reading M data from the memory A or B based on transpose addresses comprises:

reading the first data from the memory A or B after the memory A or B is full, then the next data k addresses away therefrom, repeating the process for M times, transmitting the first column of the two-dimensional array after row transformation to the FFT kernel for column transformation; reading the second data from the memory A or B, then the next data k addresses away therefrom, repeating the process for M times, transmitting the second column of the two-dimensional array after row transformation to the FFT kernel for column transformation, repeating the process until the memory A or B is empty, in the last time data are read from the off-chip SDRAM to the on-chip memory, data in the remaining $N-(n_1+1)*k$ column in the off-chip SDRAM are written into the on-chip memory, and data in a column are read every $N-(n_1+1)*k$ data.

In a class of this embodiment, the step of reading data from the off-chip SDRAM and storing the data into the on-chip memory in a manner of sequential burst is as follows:

as the memory A is empty and data in the memory B are read into the FFT kernel for column transformation, data in the off-chip SDRAM need to be read into the memory A in parallel; as data in the off-chip SDRAM are read for the first time, k data are sequentially read and stored in the memory A, k data N−3k addresses away from a position of the last data read during the last time are read and stored in the memory A, then the process is repeated for M times, until M*k data are all written into the memory A; as data in the off-chip SDRAM are read for the $q^{th}$ time, k data are sequentially read from a position (q−1)*k addresses away from the beginning and stored in the memory A, then k data N−3k addresses away from a position of the last data read during the last time are read and stored in the memory A, then the process is repeated for M times, until M*k data are all stored in the memory A;

as data in the off-chip SDRAM are read for the $q_1^{th}$ time, where $$q_1 \geq \frac{N - 2k}{k},$$

and this is the last time that data in the off-chip SDRAM are read into the on-chip memory; $N-(q_1+1)*k$ data are sequentially read from a position $(q_1-1)*k$ addresses away from the beginning, then $N-(q_1+1)*k$ data $(q_1-1)*k$ addresses away from a position of the last data read during the last time are read and stored in the memory A, then $N-(q_1+1)*k$ data $(q_1-1)*k$ addresses away from a position of the last data read during the last time are read and stored in the memory A, the process is repeated for M times, until row transformation results in the off-chip SDRAM are read out.

In a class of this embodiment, in step (e), if the memory A is empty and the memory B is not full, alternative operation on the memory A and the memory B cannot be conducted until the memory B is full.

By employing the row transposed architecture, the invention can significantly reduce the number of cross-line reading by the SDRAM, and thus improving execution speed of a two-dimensional FFT.

BRIEF DESCRIPTION OF ACCOMPANYING DRAWINGS

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Figure 1:
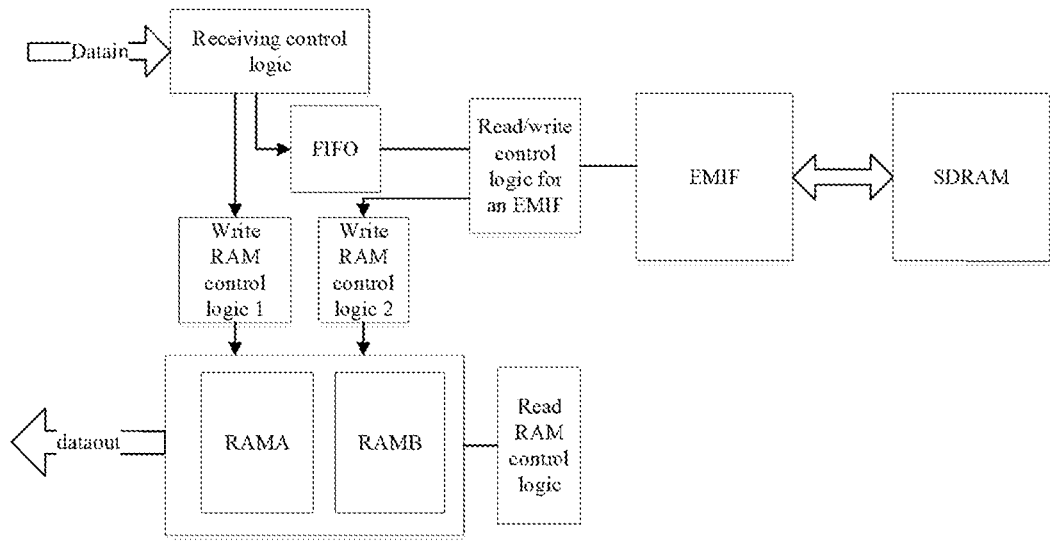
FIG. 1 is a block diagram of a row transposed architecture based on a two-dimensional FFT processor.

As shown in FIG. 1, a row transposed architecture based on a two-dimensional FFT processor comprises a receiving control logic for FFT row transformation results, an on-chip memory, a FIFO for buffering and writing data from a SDRAM, an external memory interface (EMIF) for controlling reading and writing of an off-chip memory, a read/write control logic for the EMIF, and a read/write control logic for the on-chip memory.

A capacity of the on-chip memory is 8192*15*64 bits. The on-chip memory employs a Ping-pang buffer structure, and comprises a memory A and another memory B. Each of the memory A and the memory B comprises seven 64*8192 bits random access stored program machines (RASP) and one 64*4096 bits RASP, and is controlled by unified addressing. The FIFO employs a 128*64 bit two-port RFTP. The write RAM control logic 1 operates to write some results obtained by FFT row transformation into the on-chip memory. The write RAM control logic 2 operates to read row transformation results buffered into the SDRAM into the on-chip memory. The read RAM control logic operates to output row transformation results in the RAM in a transposed manner.

Figure 2:
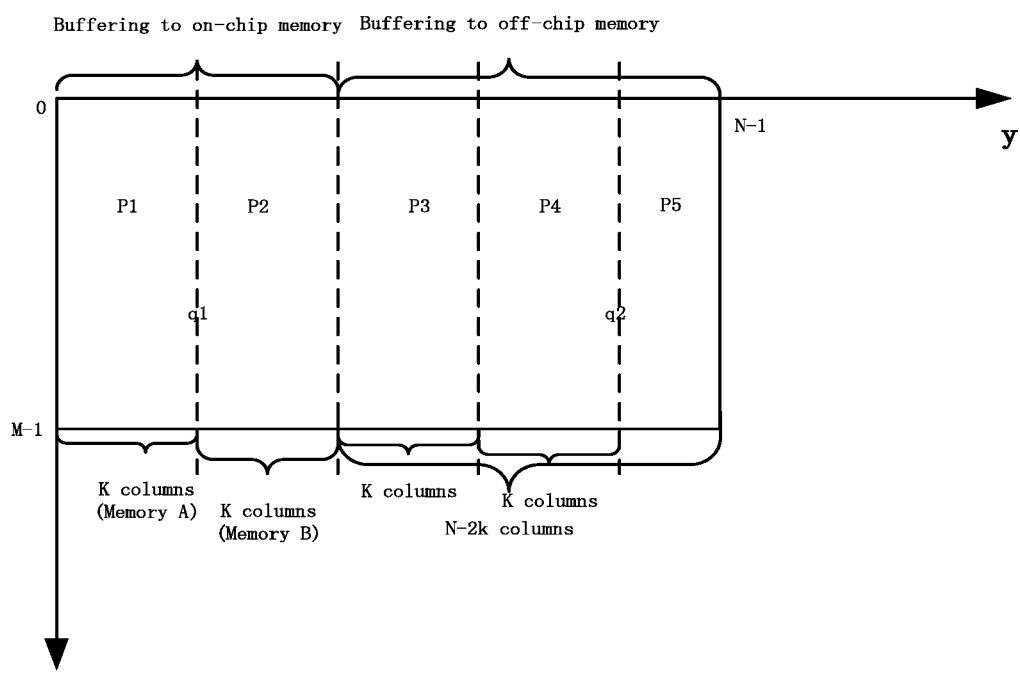
FIG. 2 illustrates storage of row transposed results.
Figure 3:
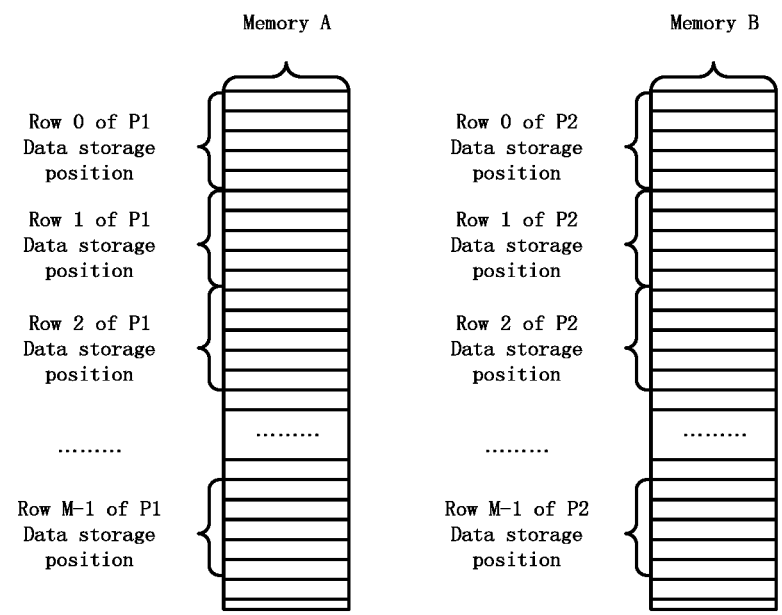
FIG. 3 illustrates a data storage process by an on-chip memory.
Figure 4:
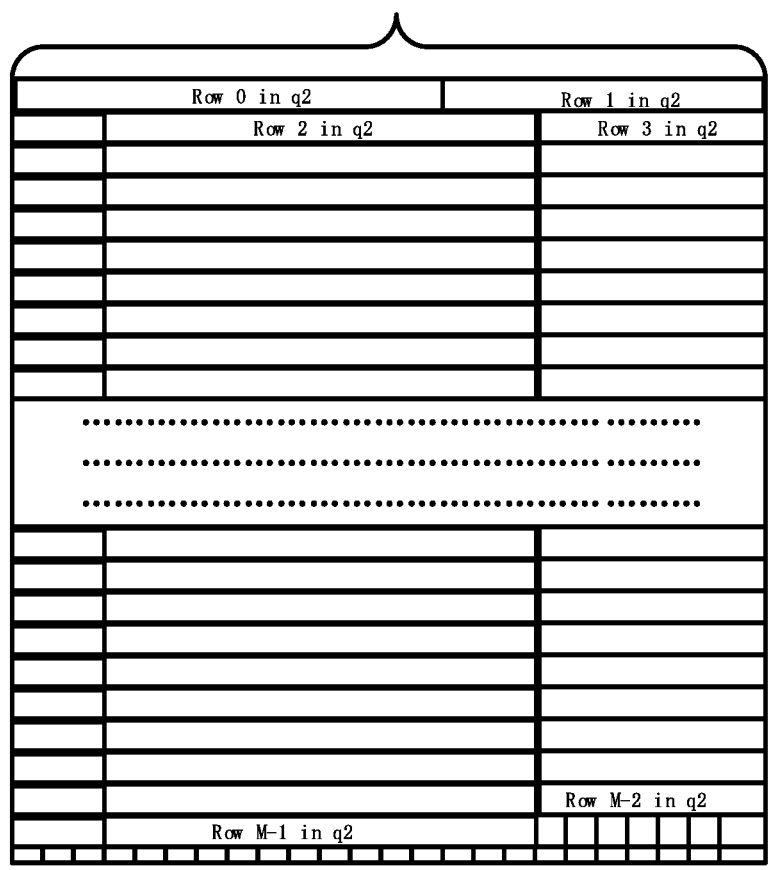
FIG. 4 illustrates a data storage process by an off-chip memory.
Figure 7:
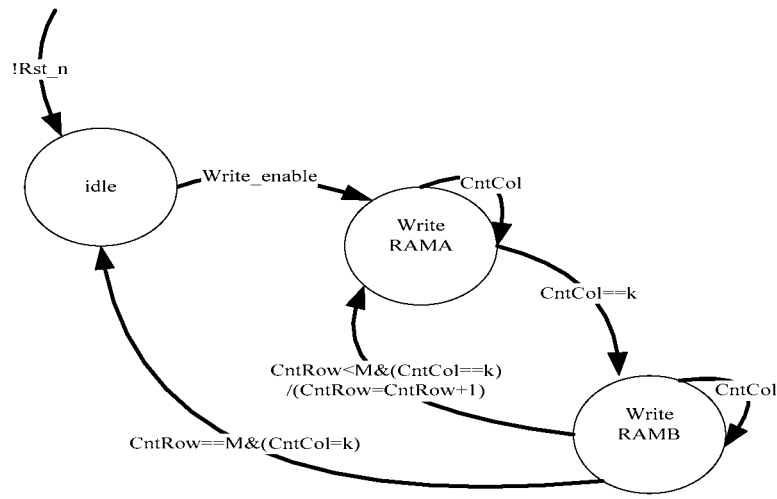
FIG. 7 illustrates a state machine of a write RAM control logic 1.

As shown in FIGS. 2 to 4, the receiving control logic operates to receive a row transformation result from an output end of a FFT kernel, and then the write RAM control logic 1 and the read/write control logic for the EMIF operate to write the row transformation result into the on-chip memory and the off-chip SDRAM: data on the first 2k columns are buffered on the on-chip memory, data on the last (N−2k) column are buffered on the off-chip memory; specifically, data on the first k columns are buffered in the memory A, and data on the remaining k columns are buffered in the memory B. As shown in a state machine in FIG. 7, the write RAM control logic 1 buffering data on the first 2k columns on the on-chip memory is illustrated, where CntCol is a counter for recording the number of input data, k represents the number of data on each row of the input data that are written into the on-chip memory, CntRow records the number of rows written into the on-chip memory.

Figure 6:
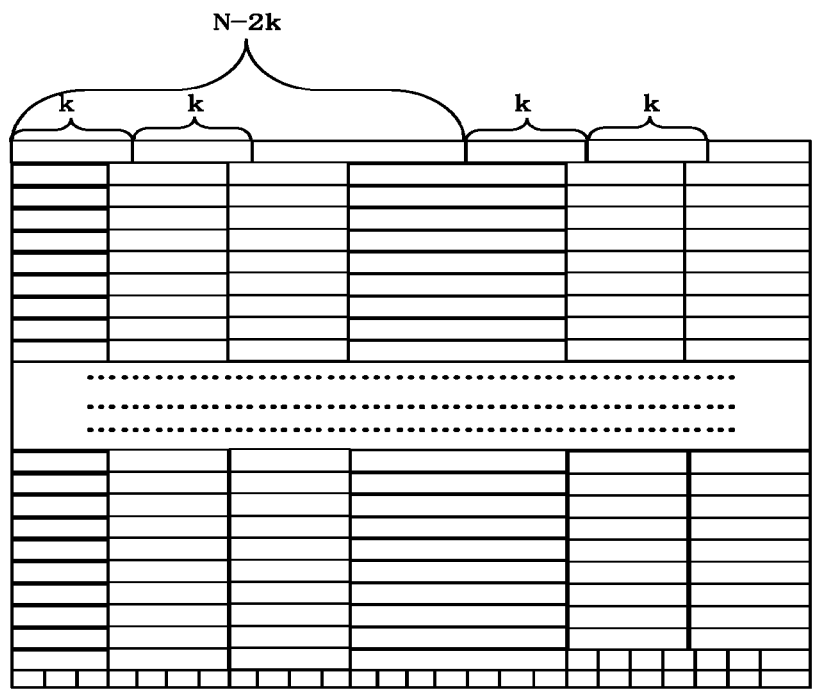
FIG. 6 illustrates a data reading process by an off-chip memory.

As shown in FIG. 6, the read/write control logic for the EMIF operates to read data from the off-chip SDRAM, and the write RAM control logic 2 operates to write the data read by the read/write control logic for the EMIF into the on-chip memory. As data are read from the off-chip memory for the first time, k data are sequentially read and stored in the on-chip memory A, k data N−3k addresses away from a position of the last data read during the last time are read and stored in the on-chip memory, then the process is repeated for M times, until M*k data are all written into the memory A; as data in the off-chip SDRAM are read for the C0 time, k data are sequentially read from a position (q−1)*k addresses away from the beginning and stored in the on-chip memory, then k data N−3k addresses away from a position of the last data read during the last time are read and stored in the on-chip memory, then the process is repeated for M times.

As data in the off-chip SDRAM are read into the on-chip memory for the $q_1^{th}$ time in manner of burst, where k≥N−$(q_1+1)k$, and this is the last time that data in the off-chip SDRAM are read into the on-chip memory; N−$(q_1+1)$*k data are sequentially read from a position $(q_1-1)$*k addresses away from the beginning, then N−$(q_1+1)$*k data $(q_1-1)$*k addresses away from a position of the last data read during the last time are read and stored in the memory A, then N−$(q_1+1)$*k data $(q_1-1)$*k addresses away from a position of the last data read during the last time are read and stored in the memory A, the process is repeated for M times, until row transformation results in the off-chip SDRAM are read out.

Figure 8:
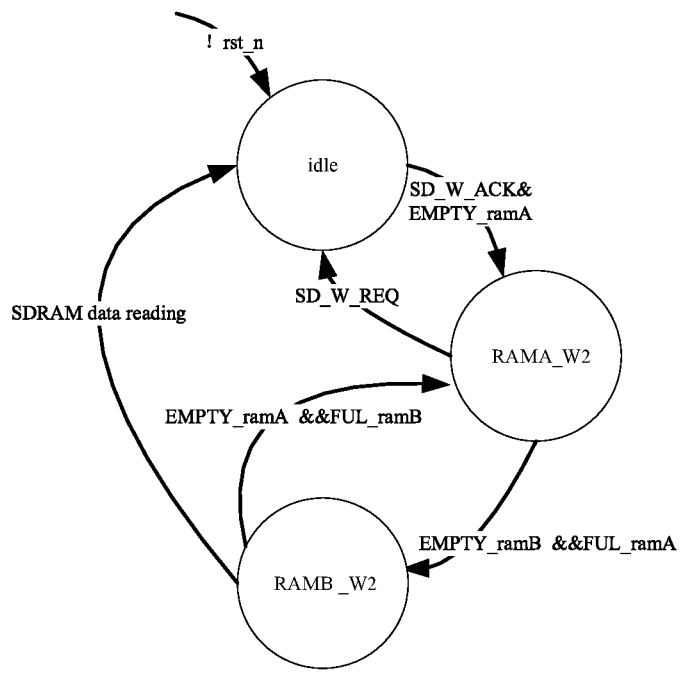
FIG. 8 illustrates a state machine of another write RAM control logic 2.
Figure 10:
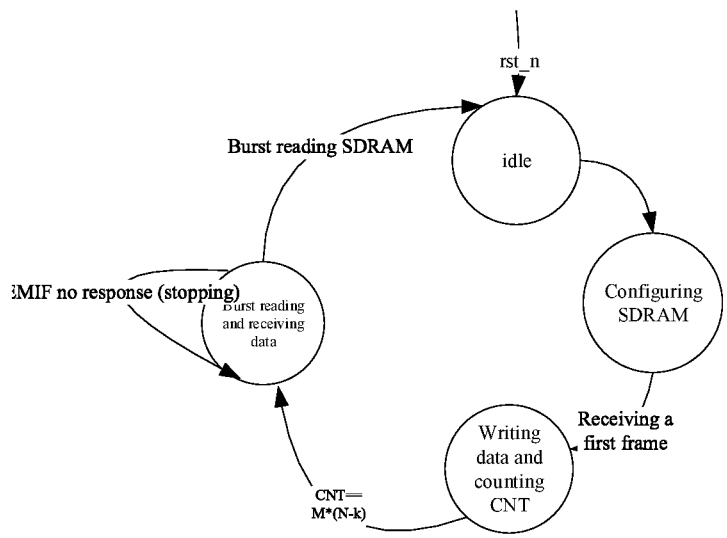
FIG. 10 illustrates a state machine of an EMIF read/write control logic.

As shown in a state machine in FIGS. 8 and 10, the read/write control logic for the EMIF operates to read data from the off-chip SDRAM, and the write RAM control logic 2 operates to write the data read by the read/write control logic for the EMIF into a Ping-pang structure of the on-chip memory. In FIG. 8, SD_W_REQ is a read request signal transmitted to the read/write control logic for the EMIF by the write RAM control logic 2, SD_W_ACK is a handshaking response signal transmitted to the write RAM control logic 2 by the read/write control logic for the EMIF. Upon detecting the read request signal from the write RAM control logic 2, as well as an empty flag of the memory A, the read/write control logic for the EMIF starts to read data from the off-chip SDRAM and write the data into the memory A. As the memory A is full, the flag is set to full. Upon detecting an empty flag of the memory B, the read/write control logic for the EMIF starts to read data from the off-chip SDRAM and write the data into the memory B. As the memory B is full, the flag is set to full. Then the above process is repeated, namely the empty flag operates as a starting signal for writing data into the memory A or B. As the off-chip SDRAM is empty, a flag of the on-chip memory is set to full, and addresses for writing data into the memory are continuous.

In FIG. 10, as power-on reset is undone, the EMIF needs to configure the SDRAM first, receive data written therein from a previous FIFO, and sequentially write data into the SDRAM according to respective address, using a frame that is firstly received as a start write flag (CNT is a counter for recording the number of data written into the SDRAM). After data are all written into the SDRAM, the EMIF waits for a read request from the write RAM control logic 2. Upon receiving the read request, the EMIF responds by reading the data in the SDRAM (the reading process is described as above), and transmitting the data to the memory A or B.

Figure 5:
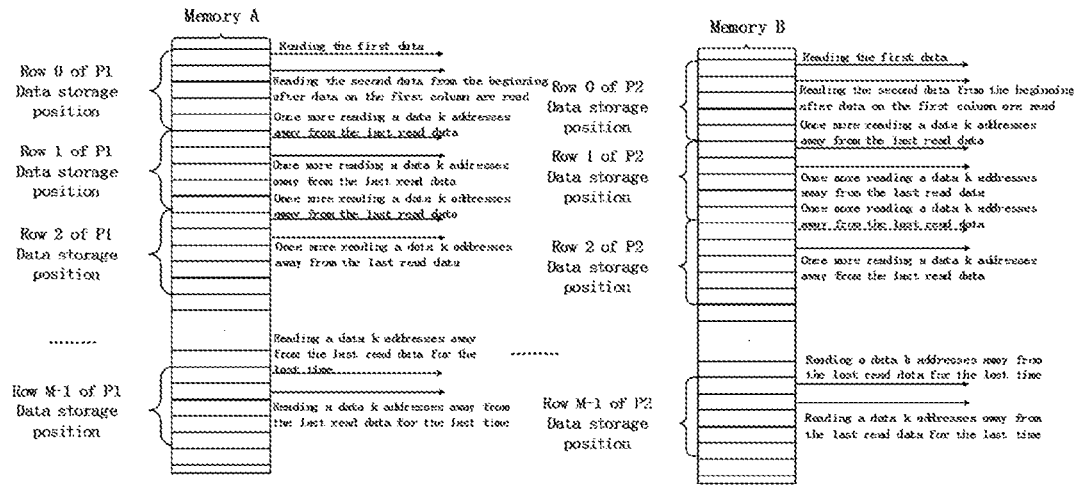
FIG. 5 illustrates a data reading process by an on-chip memory.

As shown in FIG. 5, the read RAM control logic operates to output row transformation results in the RAM in a transposed manner. As the memory needs to be read, the first data are read therefrom, then the next data k addresses away therefrom are read, the process is repeated for M times, column transformation is conducted on the first column of the two-dimensional array after row transformation; then the second data are read therefrom, the next data k addresses away therefrom are read, the process is repeated for M times, column transformation is conducted on the two-dimensional array after row transformation, the process is repeated for k times, until column transformation are conducted on data on all k columns. The on-chip memory is the memory A or B.

As data in the off-chip SDRAM are read into the on-chip memory for the last time, row transformation results in the SDRAM are written into the on-chip memory, the first data are read from the memory, data N−(q$_1$+1)*k addresses away therefrom are sequentially read, the process is repeated for M times, a column of the two-dimensional array after row transformation is transmitted to the FFT kernel for column transformation, then the second data are read from the memory, data N−(q$_1$+1)*k addresses away therefrom are sequentially read, the process is repeated for M times, a column of the two-dimensional array after row transformation is transmitted to the FFT kernel for column transformation, the total process is repeated for N−(q$_1$+1) times, and data on all N−(q$_1$+1)*k columns in the memory are transmitted to the FFT kernel for column transformation.

Figure 9:
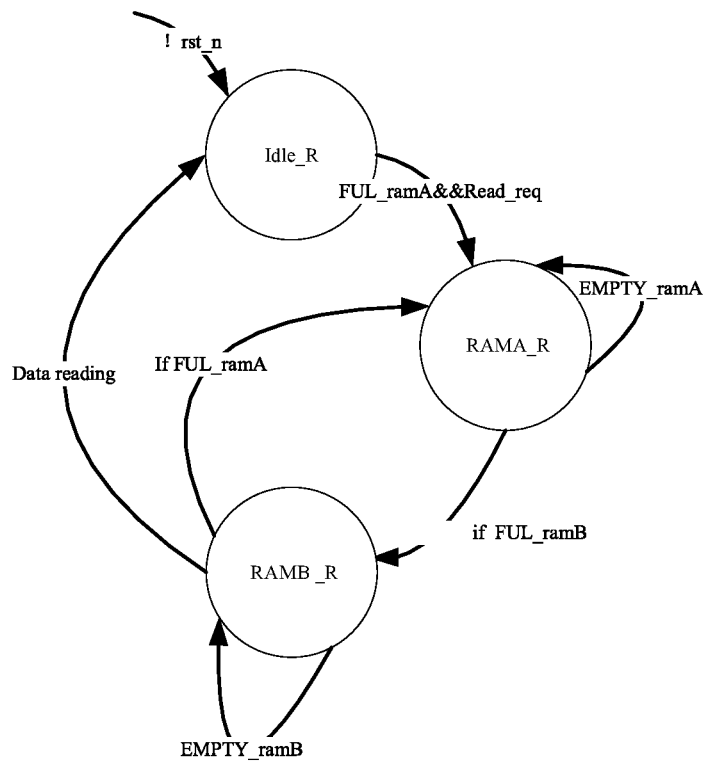
FIG. 9 illustrate a state machine of a read RAM control logic.

As shown in a state machine in FIG. 9, where Read_req is a read request signal output from the off-chip memory, each of the memory A and the memory B has a full flag. Each time if the full flag is detected to be high level, the corresponding memory is read according to a transposed address, as described hereinbefore.

If M*N is less than the capacity of the on-chip memory, no off-chip SDRAM is required, and thus the read/write control logic for the EMIF is not necessarily started, which makes the invention more simple for implementation.

The FFT kernel of the invention can process one data per clock cycle, and the key for improving a speed of the FFT processor is to increase a speed of row transposition. Since row transposition needs to completely buffer a frame of image and then read it, and normally a size of the image may vary in a wide range, the on-chip memory cannot meet requirement for storage. By employing the off-chip SDRAM with large storage capacity, it is possible to reduce design cost. However, row activation time of the off-chip SDRAM (namely the time from a row activation instruction becomes available to a read/write instruction is available) must meet requirement for Row Address Strobe to column address strobe delay (tRCD), if read operation is conducted from the off-chip SDRAM according to column addresses, addresses transmitting to the SDRAM are inconsistent, which may result in many times of row activation operation by the SDRAM upon reading data on a column, and thus a very low read speed of the SDRAM, as well as a decreased column transformation speed of the FFT kernel. The row transposed architecture based on the two-dimensional FFT processor of the invention makes full use of the on-chip memory, all transposition operation are conducted on the on-chip memory, data of the off-chip SDRAM are only read into the on-chip memory for buffering, and then the on-chip memory are read according to transposed addresses, thus it is possible to read the off-chip SDRAM in a manner of sequential burst, which prevents cross-line reading, and improves a column transformation speed of the FFT kernel.

The most ideal situation for row transposition is to process one data per clock cycle, so as to match with a processing speed of the FFT kernel. Assuming cross-line reading of the SDRAM takes t clock cycles for row activation and pre-charging operation, then compared with the ideal situation, time spent on row transposition of the invention is longer than that under the ideal situation, and time difference therebetween is just time of cross-line reading. Taking transposition of a 512*512 image for example, the number of columns buffered by the on-chip memory is 240, and that buffered by the off-chip memory is 272. Assuming q$_1$=3 (namely transposition of a frame of image requires reading data from the SDRAM into the on-chip memory for three times), the number of columns of each bank in the SDRAM is 1024, then the number of rows in the SDRAM is 136. Compared with the ideal situation, the whole process takes time of 136*3*t=408t. Assuming t equals to 16 clock cycles, the whole process takes 6528 clock cycles, which is only 1.2% greater than that in the ideal situation (which is 512*512*2=524288 clock cycles), and it can be seen that both time is very close.

While preferred embodiments of the invention have been described above, the invention is not limited to disclosure in these embodiments and the accompanying drawings. Any changes or modifications without departing from the spirit of the invention fall within the scope of the invention.

What is claimed is:

1. A method for generating a row transposed architecture based on a two-dimensional FFT processor, comprising steps of:
   S1. determining whether a size of a two-dimensional array after row transformation M*N is greater than the number of memory cells s of an on-chip memory, proceeding to step S2 if yes, and proceeding to step S3 if no, where M represents the number of rows of said two-dimensional array, N represents the number of columns of said two-dimensional array, and ½s is greater than M;
   S2. conducting row transposition by said on-chip memory and an off-chip SDRAM, comprising sub-steps of:
   (a) dividing said on-chip memory into two memories A and B, each memory having ½s memory cells;
   (b) sequentially writing first k data of a row of said two-dimensional array after row transformation into said memory A, the following k data thereof into said on-chip memory B, and the remaining (N−2k) data thereof into said off-chip SDRAM, and repeating the process for the remaining rows of said two-dimensional array until all data of all rows thereof are sequentially written into said memories A and B, and said off-chip SDRAM, where $$k = \left[\frac{s}{2M}\right];$$

(c) repeatedly reading M data from said memory A based on transpose addresses and transmitting said M data to a FFT kernel for column transformation, until all data in said memory A are read;
   (d) repeatedly reading M data from said memory B based on a transposed addresses and transmitting said M data to a FFT kernel for column transformation, and repeatedly reading and parallel executing first X data of a row of said two-dimensional array from said off-chip SDRAM in a manner of sequential burst, and writing said data into said memory A until all data of first X columns thereof are written into said memory A, where $$X = \begin{cases} k; \text{when} & k \leq N - (n+1)k \\ N - (n+1)k; \text{when} & k > N - (n+1)k \end{cases}$$

n represents the n$^{th}$ time data are written from said off-chip SDRAM and written into said on-chip memory;
   (e) reading data in said memory A according to said transposed address, executing reading data from said off-chip SDRAM to said memory B in parallel, and simultaneously reading said memory A and writing said memory B according to step (d) until said memory A is empty and said memory B is full, then simultaneously reading said memory B and writing said memory A according to step (d) until said memory B is empty and said memory A is full, and repeating the above process until the $n_1^{th}$ time where data are read from said off-chip SDRAM to said on-chip memory (where $$\left(\text{where } n_1 \geq \frac{N-2k}{k}\right),$$

reading data on the $[N-(n_1+1)*k]^{th}$ column, and emptying said off-chip SDRAM;

S3. conducting row transposition by said on-chip memory:

serially writing results after two-dimensional row transformation into said memories A and B, namely buffering first ½N data on every row of totally M rows into said memory A, and last ½N data thereon into said memory B;

reading data in said memory A according to said transposed address until said memory A is empty, namely reading M data and transmitting said data to a FFT kernel for column transformation each time, and reading data in said memory B according to said transposed address until said memory B is empty, namely reading M data and transmitting said data to said FFT kernel for column transformation each time.

2. The method for generating a row transposed architecture based on a two-dimensional FFT processor of claim 1, wherein writing operation in step (b) is as follows:

sequentially writing M*N data generated by two-dimensional row transformation into said on-chip memory and said off-chip SDRAM, and writing first k data of a row of said two-dimensional array into said memory A, the following k data thereof into said on-chip memory B, and the remaining (N−2k) data thereof into said off-chip SDRAM, thus M rows generated by two-dimensional row transformation are written into said on-chip memory and said off-chip SDRAM, the first M*2k image pixels being stored in said on-chip memory, and the last M*(N−2k) image pixels being stored in said off-chip SDRAM.

3. The method for generating a row transposed architecture based on a two-dimensional FFT processor of claim 1, wherein the step of repeatedly reading M data from said memory A or B based on transpose addresses comprises:

reading the first data from said memory A or B after said memory A or B is full, then the next data k addresses away therefrom, repeating the process for M times, transmitting the first column of said two-dimensional array after row transformation to said FFT kernel for column transformation; reading the second data from said memory A or B, then the next data k addresses away therefrom, repeating the process for M times, transmitting the second column of said two-dimensional array after row transformation to said FFT kernel for column transformation, repeating the process until said memory A or B is empty, in the last time data are read from said off-chip SDRAM to said on-chip memory, data in the remaining $N-(n_1+1)*k$ column in said off-chip SDRAM are written into said on-chip memory, and data in a column are read every $N-(n_1+1)*k$ data.

4. The method for generating a row transposed architecture based on a two-dimensional FFT processor of claim 1, wherein the step of reading data from said off-chip SDRAM and storing said data into said on-chip memory in a manner of sequential burst is as follows:

as said memory A is empty and data in said memory B are read into said FFT kernel for column transformation, data in said off-chip SDRAM need to be read into said memory A in parallel; as data in said off-chip SDRAM are read for the first time, k data are sequentially read and stored in said memory A, k data N−3k addresses away from a position of the last data read during the last time are read and stored in said memory A, then the process is repeated for M times, until M*k data are all written into said memory A; as data in said off-chip SDRAM are read for the CO time, k data are sequentially read from a position (q−1)*k addresses away from the beginning and stored in said memory A, then k data N−3k addresses away from a position of the last data read during the last time are read and stored in said memory A, then the process is repeated for M times, until M*k data are all stored in said memory A;

as data in said off-chip SDRAM are read for the $q_1^{th}$ time, where $$q_1 \geq \frac{N-2k}{k},$$

and this is the last time that data in said off-chip SDRAM are read into said on-chip memory; $N-(q_1+1)*k$ data are sequentially read from a position $(q_1-1)*k$ addresses away from the beginning, then $N-(q_1+1)*k$ data $(q_1-1)*k$ addresses away from a position of the last data read during the last time are read and stored in said memory A, then $N-(q_1+1)*k$ data $(q_1-1)*k$ addresses away from a position of the last data read during the last time are read and stored in said memory A, the process is repeated for M times, until row transformation results in said off-chip SDRAM are read out.

5. The method for generating a row transposed architecture based on a two-dimensional FFT processor of claim 1, wherein in step (e), if said memory A is empty and said memory B is not full, alternative operation on said memory A and said memory B cannot be conducted until said memory B is full.

* * * * *